US 6,551,423 B1

(12) United States Patent
Spitsberg et al.

(10) Patent No.: US 6,551,423 B1
(45) Date of Patent: Apr. 22, 2003

(54) PREPARATION OF LOW-SULFUR PLATINUM AND PLATINUM ALUMINIDE LAYERS IN THERMAL BARRIER COATINGS

(75) Inventors: Irene T. Spitsberg, Loveland, OH (US); William S. Walston, Maineville, OH (US); Jon C. Schaeffer, Milford, OH (US)

(73) Assignee: General Electric Co., Cincinnati, OH (US)

( * ) Notice: Subject to any disclaimer, the term of this patent is extended or adjusted under 35 U.S.C. 154(b) by 433 days.

(21) Appl. No.: 09/149,018

(22) Filed: Sep. 8, 1998

(51) Int. Cl.⁷ ............................ C25D 5/10; C22F 1/10
(52) U.S. Cl. ............................ 148/518; 148/535
(58) Field of Search ........................ 148/518, 535

(56) References Cited

U.S. PATENT DOCUMENTS

| 4,095,003 A | | 6/1978 | Weatherly et al. ............. 427/34 |
| 4,826,738 A | | 5/1989 | Smeggil ....................... 428/678 |
| 5,057,196 A | * | 10/1991 | Creech et al. ............. 204/181.5 |
| 5,538,796 A | | 7/1996 | Schaeffer et al. ........... 428/469 |
| 5,658,614 A | * | 8/1997 | Basta et al. ................. 427/253 |
| 5,667,663 A | * | 9/1997 | Rickerby ..................... 205/170 |
| 5,788,823 A | * | 8/1998 | Warnes et al. ............. 205/192 |
| 5,922,409 A | * | 7/1999 | McMordie et al. ...... 427/383.7 |

FOREIGN PATENT DOCUMENTS

| EP | 0 718 419 A2 | 6/1996 |
| EP | 0 733 723 A1 | 9/1996 |
| EP | 0 905 281 A1 | 3/1999 |

* cited by examiner

Primary Examiner—George Wyszomierski
Assistant Examiner—Janelle Combs Morillo

(57) ABSTRACT

A method for preparing a coated nickel-base superalloy article reduces the sulfur content of the surface region of the metallic coating layers to low levels, thereby improving the adhesion of the coating layers to the article. The method includes depositing a first layer of platinum overlying the surface of a substrate, depositing a second layer of aluminum over the platinum, and final desulfurizing the article by heating the article to elevated temperature, preferably in hydrogen, and removing a small amount of material from the surface that was exposed during the step of heating. A ceramic layer may be deposited over the desulfurized article. The article may also be similarly desulfurized at other points in the fabrication procedure.

20 Claims, 4 Drawing Sheets

PREPARATION OF LOW-SULFUR PLATINUM AND PLATINUM ALUMINIDE LAYERS IN THERMAL BARRIER COATINGS

The invention herein described was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

This invention relates to nickel-base superalloys used in high-temperature applications, and, more particularly, to articles made of such materials and having a thermal barrier coating with a platinum-aluminide bond coat.

In an aircraft gas turbine (jet) engine, air is drawn into the front of the engine, compressed by a shaft-mounted compressor, and mixed with fuel. The mixture is combusted, and the resulting hot exhaust gases are passed through a turbine mounted on the same shaft. The flow of gas turns the turbine, which turns the shaft and provides power to the compressor. The hot exhaust gases flow from the back of the engine, driving it and the aircraft forwardly.

The hotter the exhaust gases, the more efficient is the operation of the jet engine. There is thus an incentive to raise the exhaust gas temperature. However, the maximum temperature of the exhaust gases is normally limited by the materials used to fabricate the turbine vanes and turbine blades of the turbine. In current engines, the turbine vanes and blades are made of nickel-based superalloys and can operate at temperatures of up to 1900–2100° F.

Many approaches have been used to increase the operating temperature limit of the turbine blades and vanes. The compositions and processing of the materials themselves have been improved. Physical cooling techniques are used. In one widely used approach, internal cooling channels are provided within the components, and cool air is forced through the channels during engine operation.

In another approach, a metallic protective coating or a ceramic/metal thermal barrier coating system is applied to the turbine blade or turbine vane component, which acts as a substrate. The metallic protective coating is useful in intermediate-temperature applications. One known type of metallic protective coating is a platinum-aluminide coating that is formed by first depositing platinum and then aluminum onto the surface of the substrate, and then interdiffusing these constituents. A ceramic thermal barrier coating may be applied overlying the platinum-aluminide coating.

The thermal barrier coating system is useful in high-temperature applications. The ceramic thermal barrier coating insulates the component from the exhaust gas, permitting the exhaust gas to be hotter than would otherwise be possible with the particular material and fabrication process of the component. However, ceramic layers usually do not adhere well directly to the nickel-base superalloys used in the substrates. Therefore, the platinum aluminide bond coat is placed between the substrate and the thermal barrier coating to effect the adhesion of the ceramic layer to the substrate. In addition, the upper surface of the bond coat oxidizes to a protective aluminum oxide scale to inhibit oxidation of the substrate.

While superalloys coated with such ceramic/metal thermal barrier coating systems do provide substantially improved performance over uncoated materials, there remains opportunity for improvement in elevated temperature performance and environmental resistance. There is an ongoing need for improved bond coats to protect nickel-base superalloys in elevated temperature applications. This need has become more acute with the development of the newest generation of nickel-base superalloys, inasmuch as the older protective coatings are often not satisfactory with these materials. The present invention fulfills this need, and further provides related advantages.

SUMMARY OF THE INVENTION

The present invention provides a metallic coating for nickel-base superalloys. The overcoating comprises a platinum-aluminide layer useful as a metallic protective coating or as a bond coat for a thermal barrier coating system. The overcoating is in the form of a surface region that is well bonded to the substrate. The platinum-aluminide coating has good elevated-temperature stability and resistance to environmental degradation in typical gas-turbine engine applications.

In accordance with the invention, a method for preparing an article having a substrate protected by an overlying coating comprises the steps of furnishing a substrate comprising a nickel-base superalloy, thereafter depositing a first layer comprising platinum contacting an upper surface of the substrate, and thereafter depositing a second layer comprising aluminum contacting an upper surface of the first layer, leaving an exposed surface. The method further includes final desulfurizing the article to yield an article with a final-desulfurized exposed surface. The step of final desulfurizing includes the steps of heating the article to a final desulfurizing elevated temperature, and thereafter removing material from the exposed surface of the article. The heating is preferably accomplished in a reducing gas such as hydrogen, but useful results may also be achieved by heating in vacuum or even in air in some cases. After the step of final desulfurizing, a ceramic coating may be deposited overlying the final desulfurized second layer.

Optionally but desirably, after the step of depositing a first layer and before the step of depositing a second layer, the article is intermediate desulfurized at least once by heating the article to an elevated temperature in a reducing gas. After this intermediate desulfurizing step, it is preferred to remove at least some material from the exposed surface.

The deposition of the platinum-containing first layer and the aluminum-containing second layer leave these layers with a relatively high sulfur content. In particular, the first layer is normally electrodeposited onto the surface of the substrate, which leaves a high sulfur content in the first layer. The presence of excess sulfur encourages debonding of aluminum oxide formed on the surface of the bond coat but below the ceramic coating, and thence debonding of the ceramic coating, from the surface of the substrate during subsequent service. The present approach reduces the sulfur content of the platinum-aluminide interdiffused layer to a low level, about 10 parts per million by weight (ppmw) or less. The result is improved adherence of the aluminum oxide and the ceramic top coat during service.

Each heating step causes sulfur to diffuse from the bulk interior of the coating layer nearest the surface, toward the exposed surface. If the heating is performed in hydrogen, some of the sulfur reaching the exposed surface reacts with the hydrogen and is removed as hydrogen sulfide gas. However, it has been observed that chemical effects (e.g., interaction with yttrium, calcium, and possibly other minor elements present in the alloy substrate and/or the bond coat layers) and the presence of oxide layers at the exposed surface inhibit some of the sulfur from combining with hydrogen and leaving the surface, in at least some systems. The removal of some material at the exposed surface after the heating, such as by grit blasting or honing, serves to remove some of this region of excess sulfur. The newly exposed surface after the material removal has a lower sulfur content which does not encourage debonding of the subsequently formed aluminum oxide. The amount of material removed is typically quite small, on the order of from about 0.5 to about 2 micrometers, and for most applications this amount of material removal is negligible in relation to the dimensions of the final product. However, the layers may be deposited slightly thicker than otherwise would be the case, to account for the material removed.

The present approach results in a substantially reduced sulfur content in the platinum-aluminide coating, and thence in the final coated structure, with the reduction being achieved at the surface where the next overlying layer is thereafter deposited. The bond coat and the ceramic top layer achieve better adhesion during service as a result. Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
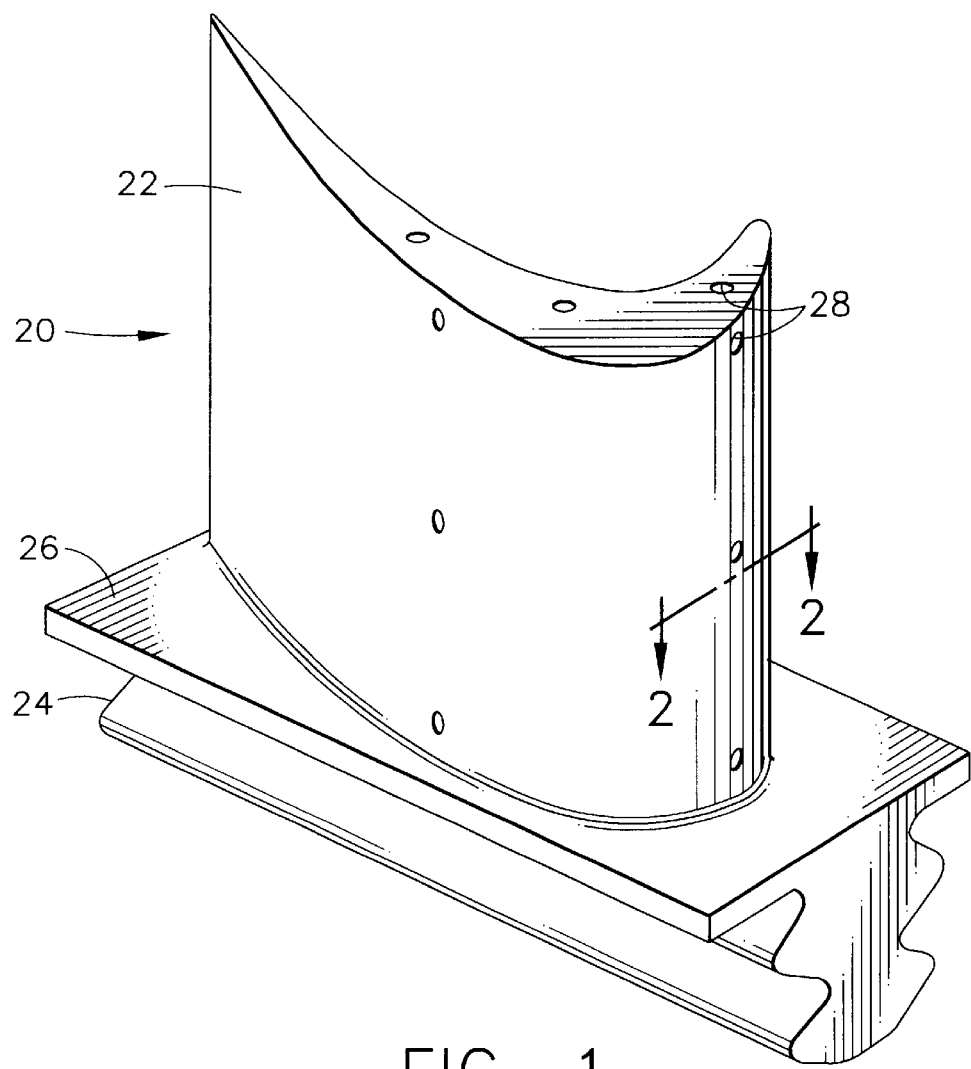
FIG. 1 is a perspective view of a turbine blade.

FIG. 1 depicts a component article of a gas turbine engine such as a turbine blade or turbine vane, and in this illustration a turbine blade 20. The turbine blade 20 includes an airfoil 22 against which the flow of hot exhaust gas is directed. The turbine blade 20 is mounted to a turbine disk (not shown) by a dovetail 24 which extends downwardly from the airfoil 22 and engages a slot on the turbine disk. A platform 26 extends longitudinally outwardly from the area where the airfoil 22 is joined to the dovetail 24. In some articles, a number of cooling channels extend through the interior of the airfoil 22, ending in openings 28 in the surface of the airfoil 22. A flow of cooling air is directed through the cooling channels, to reduce the temperature of the airfoil 22.

Figure 2:
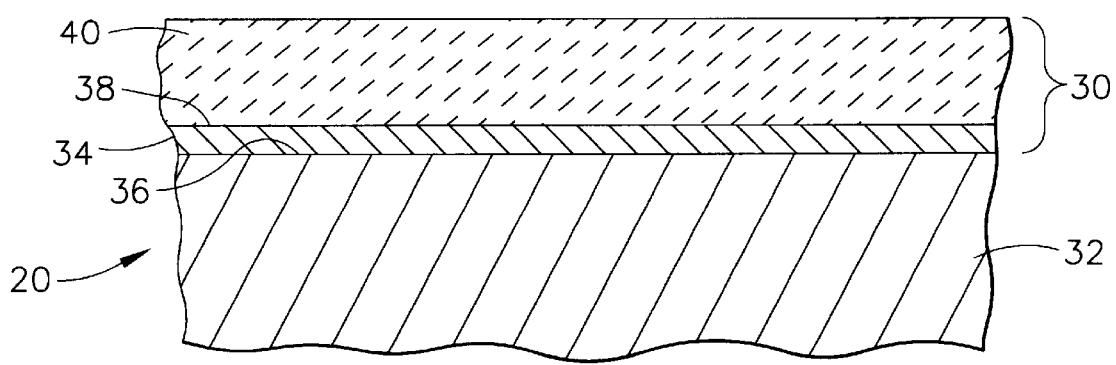
FIG. 2 is a schematic enlarged sectional view of the article of FIG. 1, illustrating a protective coating system on the surface of the article.

FIG. 2 illustrates a protective coating system 30 deposited upon the turbine blade 20, which thereby acts as a substrate 32. The substrate 32 may be formed of any operable material, but a preferred base metal from which the article substrate is formed is a nickel-base superalloy. A preferred superalloy is Rene N5™, which has a nominal composition in weight percent of 7.5 percent cobalt, 7 percent chromium, 6.2 percent aluminum, 6.5 percent tantalum, 5 percent tungsten, 1.5 percent molybdenum, 3 percent rhenium, balance nickel. Other operable superalloys include, for example, Rene N6™ and Rene 42™.

The protective coating system 30 includes a platinum-aluminide layer 34 overlying and contacting a surface 36 of the substrate 32. The layer 34 is preferably from about 50 micrometers to about 75 micrometers in thickness, but lesser or greater thicknesses are operable although less desirable. Lesser thicknesses of the layer 34 tend to have small paths or passageways therethrough. Greater thicknesses of the layer 34 are expensive and exhibit an increased tendency to separate from the substrate 32 during processing and/or service. The platinum aluminide layer 34 is typically not chemically homogeneous. Instead, it has a higher platinum content and lower aluminum content near to the surface 36, and a lower platinum content and higher aluminum content remote from the surface 36 and near to a top surface 38 of the platinum aluminide layer 34. This inhomogeneous composition profile results from the manner of preparation of the platinum alurninide layer 34, as will be discussed subsequently.

The protective system 30 may also include a ceramic coating 40 deposited upon the platinum aluminide layer 34. However, the present invention is operable in the absence of such a coating 40. In either case, the final desulfurizing aids in improving the adherence of an overlying aluminum oxide layer that forms on the top surface 38 of the platinum aluminide layer 34. The ceramic coating 40 is preferably from about 0.004 inches to about 0.025 inches thick, most preferably from about 0.005 to about 0.015 inches thick. (FIG. 2 is not drawn to scale.) The ceramic coating 40 is operable in thicknesses outside this range, but is less desirable. Lesser thicknesses of the ceramic coating 40 tend to give insufficient insulation to the substrate 32. Greater thicknesses of the ceramic coating 40 tend to separate from the article during service, particularly following thermal cycling of the article, and add unnecessary weight to the article. The ceramic coating 40 is preferably yttria-stabilized zirconia, which is zirconium oxide containing from about 6 to about 8 weight percent of yttrium oxide. Other operable ceramic materials may be used as well.

Thermal barrier protective systems of this general type are known in the art, except that the virtues of obtaining a low sulfur content in the platinum aluminide layer 34, achieved by the approach described subsequently, were not recognized.

Figure 3:
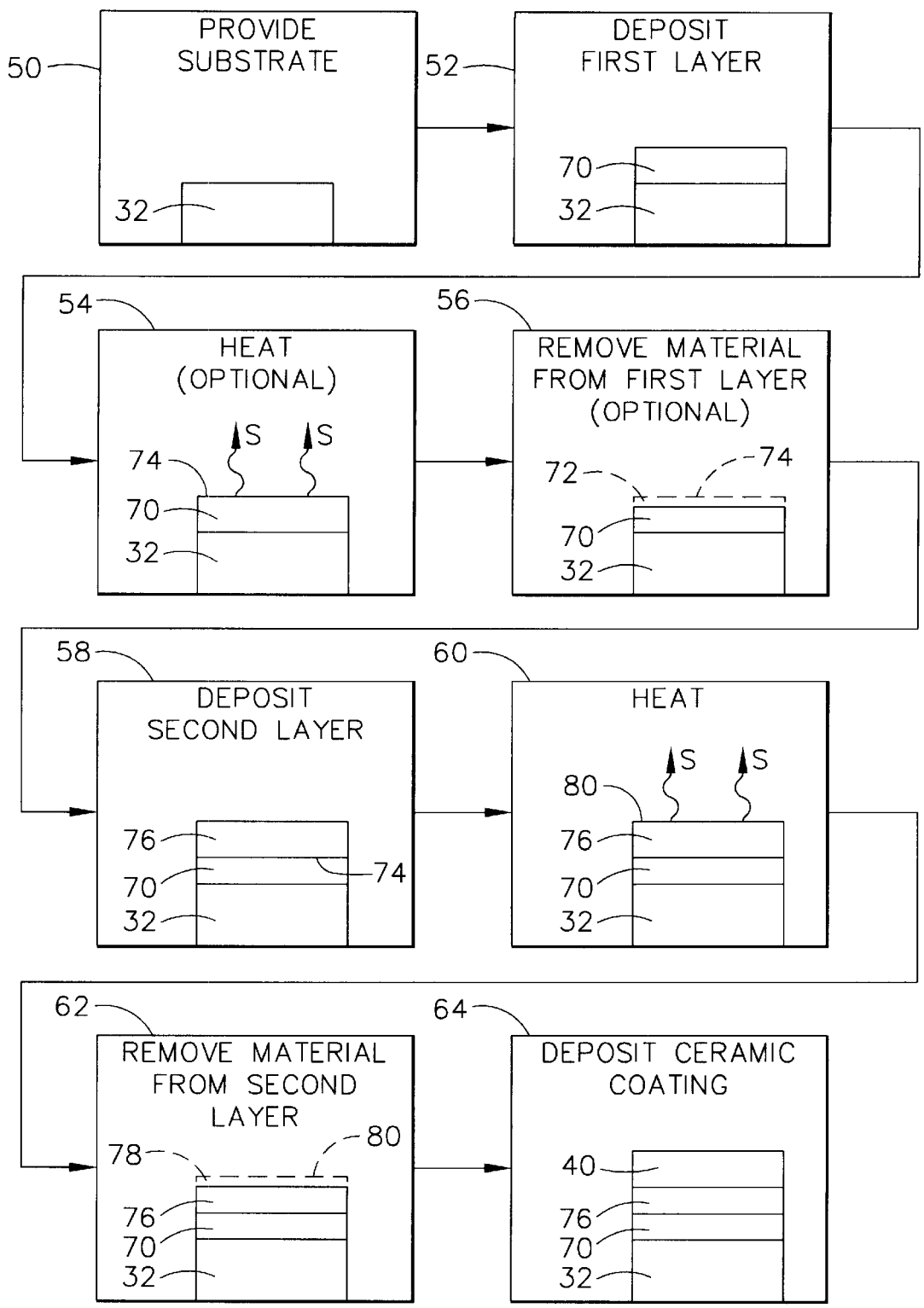
FIG. 3 is a pictorial block diagram of a preferred embodiment of the approach of the invention.

FIG. 3 illustrates in pictorial block-diagram form a preferred approach for practicing the present invention. The substrate 32 is furnished, numeral 50. The substrate 32 is in the general shape and of substantially the same size as the desired final article, such as the turbine blade 20, but it may be slightly smaller in dimensions to account for the addition of the protective coating system 30. The substrate 32 is of any operable composition, but is preferably a nickel-base superalloy and most preferably the Rene N5™ superalloy whose nominal composition was set forth above.

A first layer 70 comprising platinum, preferably pure platinum, is deposited on the surface 36 of the substrate 32 as it then is presented, numeral 52. The first layer 70 of platinum is preferably deposited by electroplating, such as from a Pt(NH$_3$)$_4$ HPO$_4$ solution. Other techniques such as chemical vapor deposition may also be used. The first layer 70 comprising platinum is preferably about 5 micrometers thick.

The first layer 70 is thereafter preferably, but not necessarily, intermediately desulfurized. The intermediate desulfurization is accomplished by intermediate heating the first layer 70 (and usually the substrate 32) to an elevated temperature, numeral 54, preferably in an atmosphere of a reducing gas. The reducing gas is preferably hydrogen. The hydrogen reacts with the sulfur reaching an exposed free surface 74 to produce hydrogen sulfide gas which is removed. The intermediate heating 54 is preferably accomplished at a temperature of from about 1925° F. to about 1975° F., for a time of no longer than about 8 hours.

When a hydrogen atmosphere is used in the heating step 54 (or in the subsequently described heating step 60), the hydrogen is at atmospheric pressure and is desirably flowed past the article being processed, as distinct from being maintained as a static atmosphere. In the apparatus used by the inventors, the hydrogen flow rate was from about 2 cubic feet STP (measured at standard temperature and pressure) per hour to about 5 cubic feet STP per hour, most preferably 5 cubic feet STP per hour. It is highly desirable that the oxygen content of the flowing hydrogen be less than about 1 part per million by volume, which is achieved by passing the gas through a getter such as zirconium sponge prior to contacting the article being processed. Otherwise, a thin film of aluminum oxide forms on the exposed free surface of the article being processed, which inhibits or prevents the reaction of sulfur with hydrogen.

After the intermediate heating 54, material 72 is removed from the exposed free surface 74 of the first layer 70, numeral 56. During the heating 54, sulfur diffuses toward the exposed free surface 74. However, there are obstacles to the sulfur reaching the exposed free surface to be reacted to form hydrogen sulfide gas and to be removed, in the case of the preferred hydrogen reducing gas. Even in a nominally pure reducing gas there is some oxidation at the exposed free surface 74 of the first layer 70. Some elements such as yttrium from the substrate and calcium from the coating segregate to the exposed free surface 74, resulting in reduced chemical activity of the sulfur at the surface. Each of these effects inhibits the combining of sulfur with hydrogen at the exposed free surface 74. Material 72 having a higher concentration of sulfur is optionally removed from the free surface by any operable technique. Shot blasting with a fine grit such as number 80 grit at 60 pounds per square inch or vapor honing is preferred to remove material from the free surface. Preferably, a thickness of material 72 of from about 0.5 micrometers to about 2 micrometers is removed.

The process is operable, but less effectively, if the heating 54 is performed in other environments such as a vacuum or an oxidizing atmosphere. In those cases, the sulfur diffusing to the exposed free surface is retained near the surface, and is removed only by the material removal step 56. Consequently, the overall sulfur removal is less efficient and less effective, and it may be necessary to remove more material from the exposed free surface in step 56.

After the optional intermediate heating 54 and material removal 56, a second layer 76 comprising aluminum is deposited overlying and contacting the first layer 70, numeral 58. The second layer 76 contacts the reduced-sulfur first layer 70. The second layer 76 is deposited by any operable approach. Preferably, a hydrogen halide gas, such as hydrogen chloride, is contacted to aluminum metal or an aluminum alloy to form the corresponding aluminum halide gas. The aluminum halide gas is contacted to the previously deposited first layer 70 overlying the substrate 32, depositing the aluminum-containing second layer 76 over the first layer 70. The reactions occur at elevated temperature such as about 1925°0 F. so that aluminum atoms transferred to the previously exposed surface 74 interdiffuse into the first layer 70 to some extent. However, for illustration purposes the second layer 76 is illustrated as distinct from the first layer 70 in FIG. 3, although they are shown together as a single layer in FIG. 2.

After deposition of the second layer 76, it is final desulfurized. The final desulfurization is accomplished by heating the second layer 76, numeral 60, and typically the substrate 32 and first layer 70 as well, to an elevated temperature. The heating is preferably accomplished in a reducing atmosphere such as hydrogen under the same conditions discussed above, but the previously discussed considerations of heating in other environments are also applicable here. The prior discussion of atmosphere types and conditions is incorporated here. The heating 60 is preferably accomplished at a temperature of from about 1800° F. to about 1975° F., for a time of from about 1 to about 4 hours. If lower temperatures and/or shorter times are used, the final desulfurization may be incomplete. If higher temperatures and/or longer times are used, no further substantial gain is achieved, and there is a concern with undesirable microstructural alterations to the underlying substrate. There is some further interdiffusion of the layers 70 and 76 during this treatment, subsequent treatments at elevated temperature, and service at elevated temperature.

After the heating step 60, material 78 is removed from the exposed free surface 80 of the second layer 76, numeral 62. During the heating step 60, sulfur diffuses toward the exposed free surface 80. However, the diffusion is inhibited for the same reasons discussed previously. Material 78 having a higher concentration of sulfur is therefore removed from the exposed free surface 80 by any operable technique, with the shot blasting and honing discussed above being preferred. Preferably a thickness of material 72 of from about 0.5 micrometers to about 2 micrometers in thickness is removed. The previously discussed adverse effects of the high-concentration sulfur region near the free surface 74 are applicable, and that discussion is incorporated here.

The ceramic coating 40, where used, is applied, numeral 64. The ceramic coating 40 may be applied by any operable technique, with electron beam physical vapor deposition being preferred.

The present approach reduces the sulfur content of the platinum aluminide layer 34 by a substantial amount, leading to better adhesion of the protective coating 30 to the substrate 32 during service. An electroplated platinum-containing first layer 70 typically has a peak sulfur level of from about 60 to about 200 ppmw, or from about 15 to about 40 ppmw on average. The present approach results in an average sulfur level in the platinum aluminide layer 34 of no more than about 10 ppmw, and typically from about 3 to about 5 ppmw. Even further reductions are possible with the use of a hydrogen heating atmosphere from which substantially all oxygen has been removed.

Figure 4:
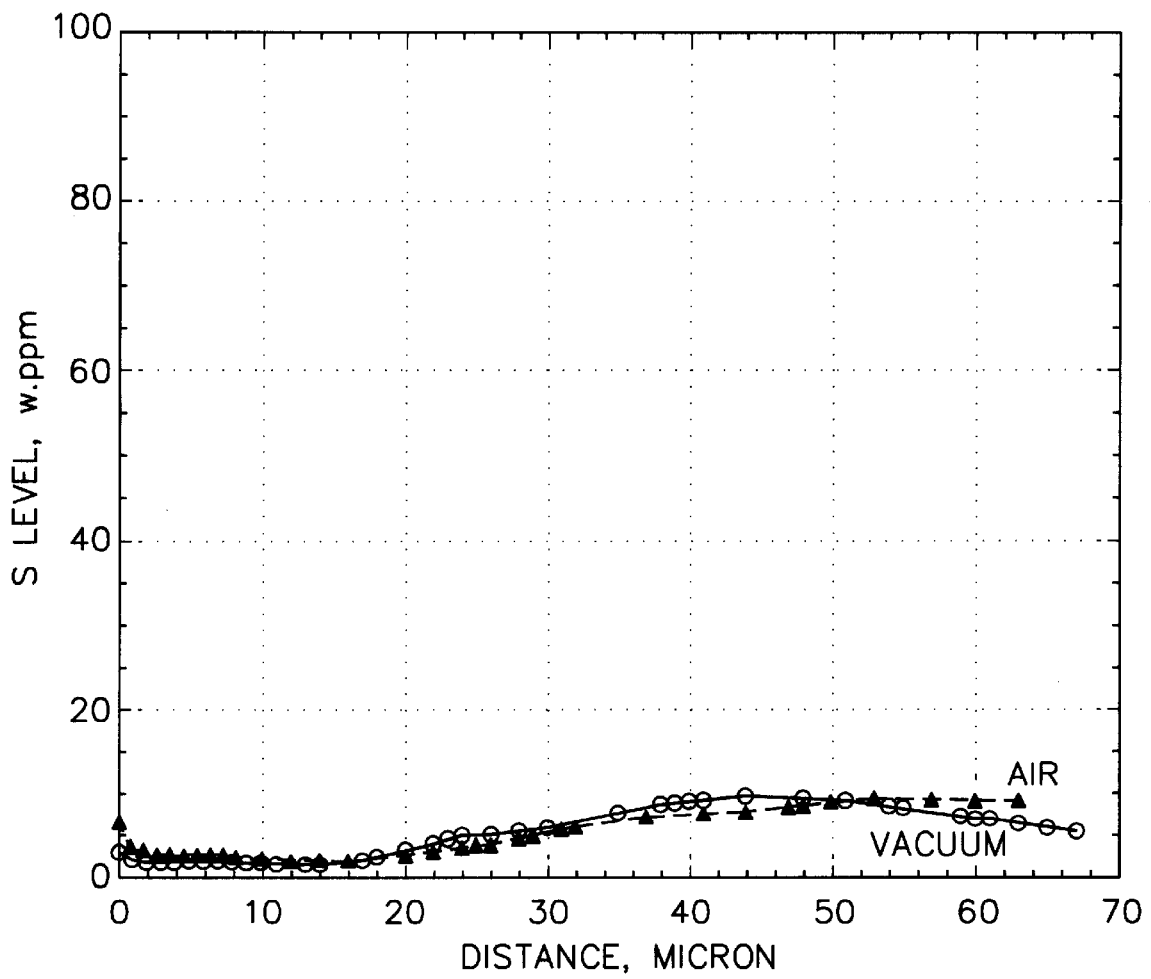
FIG. 4 is a graph of sulfur content in the bond coat as a function of distance from the bond coat surface, after heat treatment in air and vacuum followed by material removal at the surface.
Figure 5:
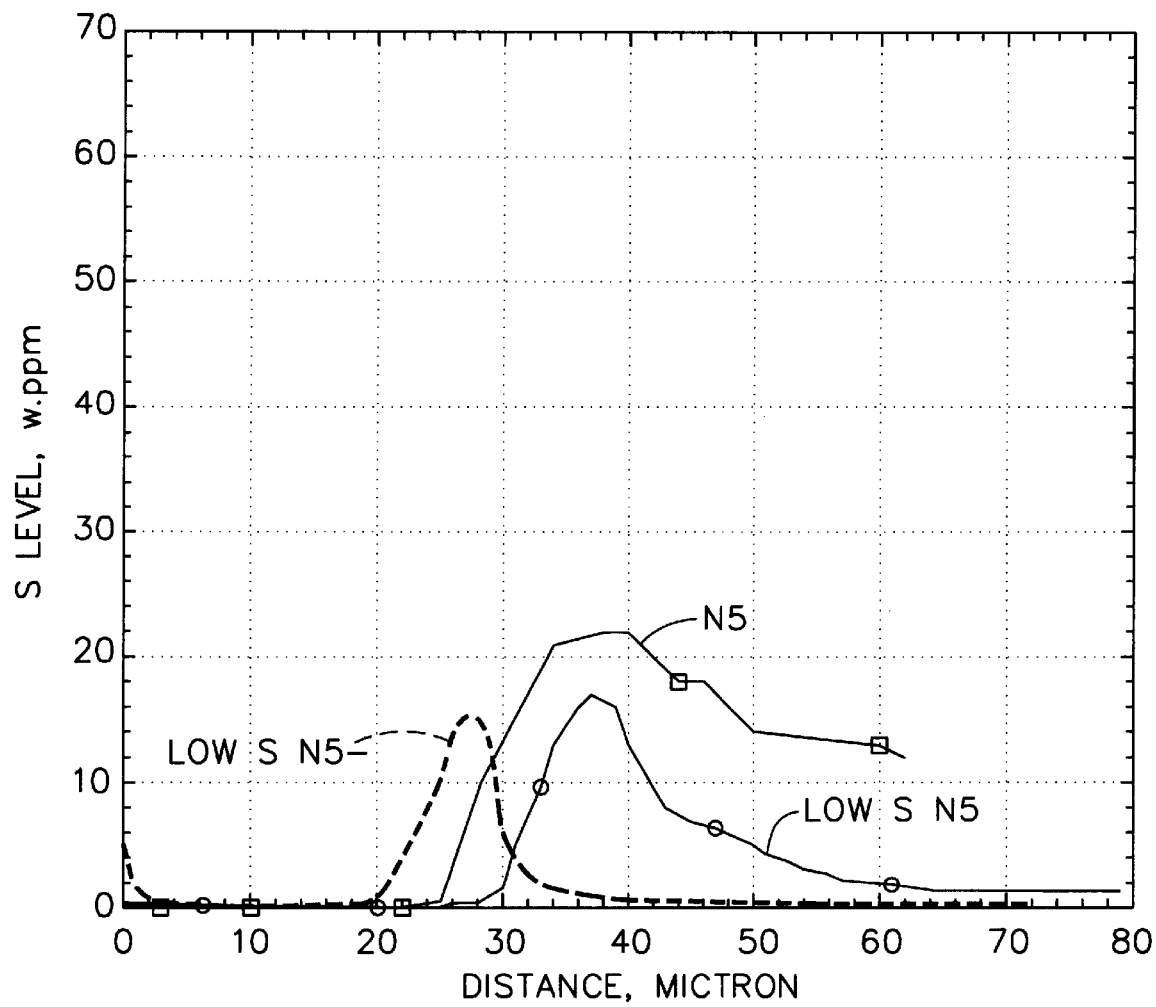
FIG. 5 is a graph of sulfur content in the bond coat as a function of distance from the bond coat surface, after heat treatment in hydrogen followed by material removal at the surface.

FIGS. 4 and 5 present the measured sulfur content of a bond coat as a function of distance from the exposed free surface of the bond coat, after heating 60 and material removal 62 at the free surface. In the process whose result is illustrated in FIG. 4, the heating step 60 was performed in air and vacuum. In the process whose result is illustrated in FIG. 5, the heating step 60 was performed in hydrogen.

Although a particular embodiment of the invention has been described in detail for purposes of illustration, various modifications and enhancements may be made without departing from the spirit and scope of the invention.

Accordingly, the invention is not to be limited except as by the appended claims.

What is claimed is:

1. A method for preparing an article having a substrate protected by an overlying coating, comprising the steps of
   furnishing a substrate comprising a nickel-base superalloy; thereafter
   depositing a first layer comprising platinum contacting an upper surface of the substrate; thereafter
   depositing a second layer comprising aluminum contacting an upper surface of the first layer, leaving an exposed surface; and thereafter
   final desulfurizing the article by removing sulfur initially in the substrate to yield an article with a final-desulfurized exposed surface, the step of final desulfurizing including the steps of
      heating the article to a final desulfurizing elevated temperature of from about 1800° F. to about 1975° F. in an atmosphere of a reducing gas, and thereafter
      removing a layer of sulfur-concentrated material from the exposed surface of the article.

2. The method of claim 1, wherein the step of final desulfurizing includes the step of
   heating the article to the final desulfurizing elevated temperature in hydrogen.

3. The method of claim 1, wherein the step of final desulfurizing includes the step of
   heating the article to the final desulfurizing elevated temperature in a vacuum.

4. The method of claim 1, wherein the step of final desulfurizing includes the step of
   heating the article to the final desulfurizing temperature of from about 1800° F. to about 1975° F., for a time of from about 1 to about 4 hours.

5. The method of claim 1, wherein the step of removing material includes the step of
   removing from about 0.5 micrometers to about 2 micrometers of material from the exposed surface of the article.

6. The method of claim 1, including an additional step, performed after the step of depositing a first layer and before the step of depositing a second layer, of intermediate desulfurizing the article by
   heating the article to an intermediate desulfurizing elevated temperature, and thereafter
   intermediately removing material from an exposed surface of the article.

7. The method of claim 6, wherein the step of intermediate desulfurizing includes the step of
   heating the article to the intermediate desulfurizing elevated temperature of from about 1925° F. to about 1975° F., for a time of no longer than about 8 hours.

8. The method of claim 6, wherein the step of intermediately removing material includes the step of
   removing from about 0.5 micrometers to about 2 micrometers of material from the exposed surface of the article.

9. The method of claim 1, including an additional step, after the step of depositing a second layer and before the step of final desulfurizing, of
   heating the article to interdiffuse the first layer and the second layer.

10. The method of claim 1, including an additional step, after the step of final desulfurizing, of
    depositing a ceramic coating overlying the final desulfurized exposed surface of the article.

11. The method of claim 1, wherein the step of depositing a first layer comprises the step of
    electrodepositing the first layer.

12. The method of claim 1, wherein the step of depositing a second layer includes the step of
    depositing the second layer from a gas phase.

13. The method of claim 1, wherein the step of heating is accomplished in an atmosphere of a flowing reducing gas.

14. A method for preparing an article having a substrate protected by an overlying coating, comprising the steps of
    furnishing a substrate comprising a nickel-base superalloy; thereafter
    depositing a first layer comprising platinum contacting an upper surface of the substrate; thereafter
    first heating the article to elevated temperature in hydrogen gas; thereafter
    removing material from an exposed surface of the first layer; thereafter
    depositing a second layer comprising aluminum contacting an upper surface of the first layer; thereafter
    second heating the article to elevated temperature in hydrogen gas; and thereafter
    removing a layer of sulfur-concentrated material from an exposed surface of the second layer.

15. The method of claim 14, wherein the step of first heating is performed at a temperature of from about 1925° F. to about 1975° F., for a time no longer than about 8 hours.

16. The method of claim 14, wherein the step of second heating is performed at a temperature of from about 1800° F. to about 1975° F., for a time of from about 1 to about 4 hours.

17. The method of claim 14, including an additional step, after the step of removing material from the exposed surface of the second layer, of depositing a ceramic coating.

18. A method for preparing an article having a substrate protected by an overlying coating, comprising the steps of
    furnishing a substrate comprising a nickel-base superalloy; thereafter
    depositing a first layer comprising platinum contacting an upper surface of the substrate; thereafter
    depositing a second layer comprising aluminum contacting an upper surface of the first layer;
    the method further including the step of
    desulfurizing the article after at least one of the steps of depositing the first layer and depositing the second layer, by the steps of
       heating the article to elevated temperature, and thereafter
       removing a thickness of from about 0.5 micrometers to about 2 micrometers of material from a surface of the article which was exposed during the step of heating.

19. The method of claim 18, including an additional step, after the step of depositing a second layer and after any step of desulfurizing performed after the step of depositing a second layer, of
    depositing a ceramic coating.

20. The method of claim 3, wherein the step of heating the article is accomplished in an atmosphere of a reducing gas.

* * * * *